United States Patent [19]
Bowman et al.

[11] 4,359,150
[45] Nov. 16, 1982

[54] CONVEYOR BELT CLEANER

[75] Inventors: Michael A. Bowman, Macomb; Steven R. Frank, Mineral, both of Ill.; Richard P. Stahura, Springdale, Pa.; Robert T. Swinderman, Kewanee, Ill.

[73] Assignee: Martin Engineering Company, Neponset, Ill.

[21] Appl. No.: 307,170

[22] Filed: Sep. 30, 1981

Related U.S. Application Data

[63] Continuation-in-part of Ser. No. 148,134, May 9, 1980, abandoned.

[51] Int. Cl.³ .............................................. B65G 45/00
[52] U.S. Cl. ................................. 198/497; 198/499; 15/256.5
[58] Field of Search ............................. 198/497–499; 24/230; 474/91, 92; 15/256.5, 256.52, 256.53

[56] References Cited

U.S. PATENT DOCUMENTS 3,504,786  4/1970  Matson ................................ 198/499
3,598,231  2/1970  Matson ................................ 198/499
3,841,470  10/1974  Meguro ............................. 198/499

Primary Examiner—John J. Love
Assistant Examiner—Brian Bond
Attorney, Agent, or Firm—McWilliams, Mann & Zummer

[57] ABSTRACT

A conveyor belt cleaner mounted on a transverse support member including an arm extending from a mounting bracket and a belt cleaner blade secured on the arm. A positioning arrangement is provided between the arm and the cleaner blade to allow the blade to rotate about the central axis of the arm within predetermined limits in either direction so as to allow the scraping edge of the cleaner blade to align with the surface of the conveyor belt being cleaned. A nut and a resilient washer are provided to secure the blade against a collar. An alternative securement includes a pin-and-slot connection which allows the same rotative action of the blade relative to the arm and having multiple seals against the entrance of dirt into the connection.

13 Claims, 16 Drawing Figures

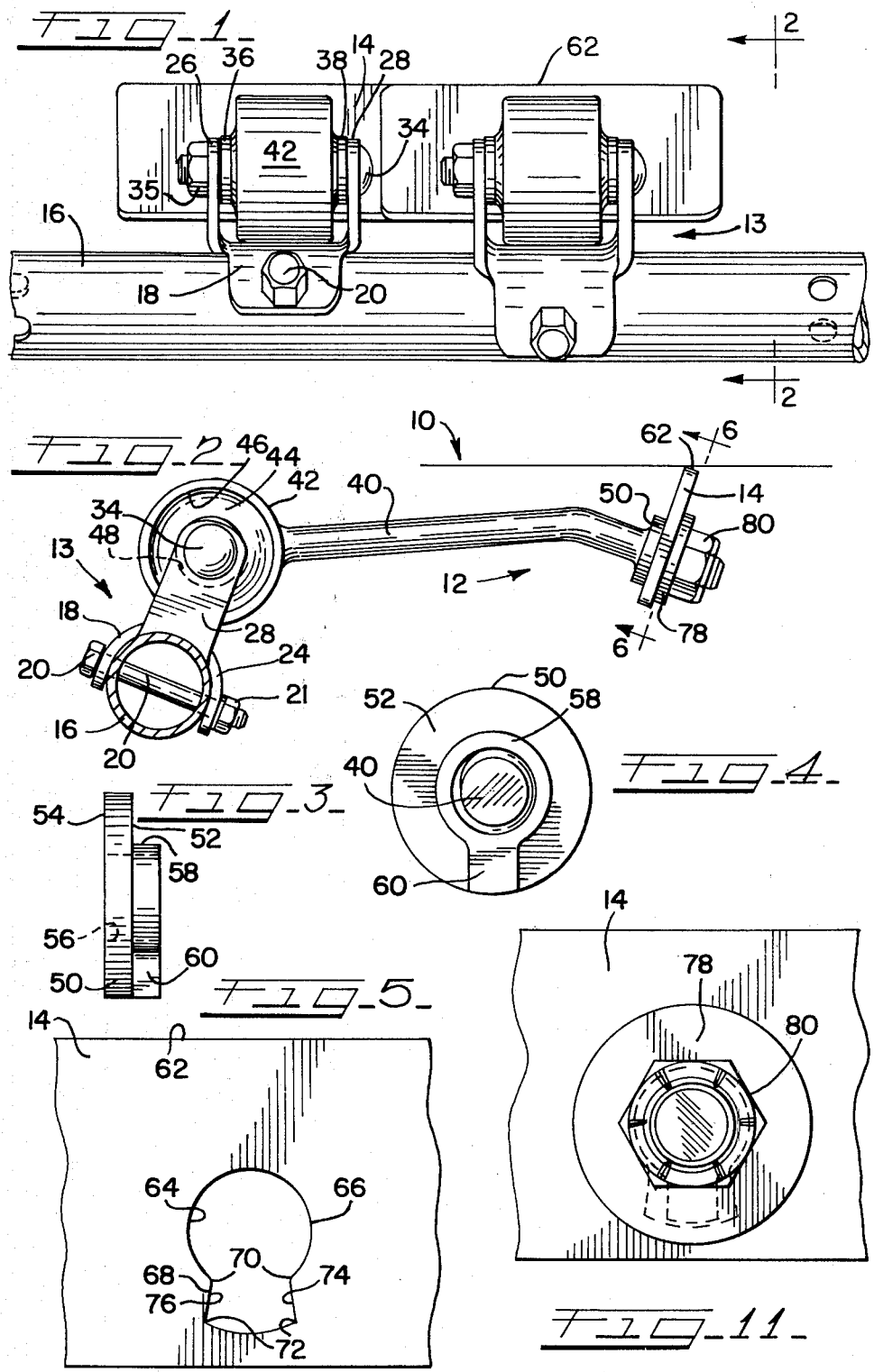

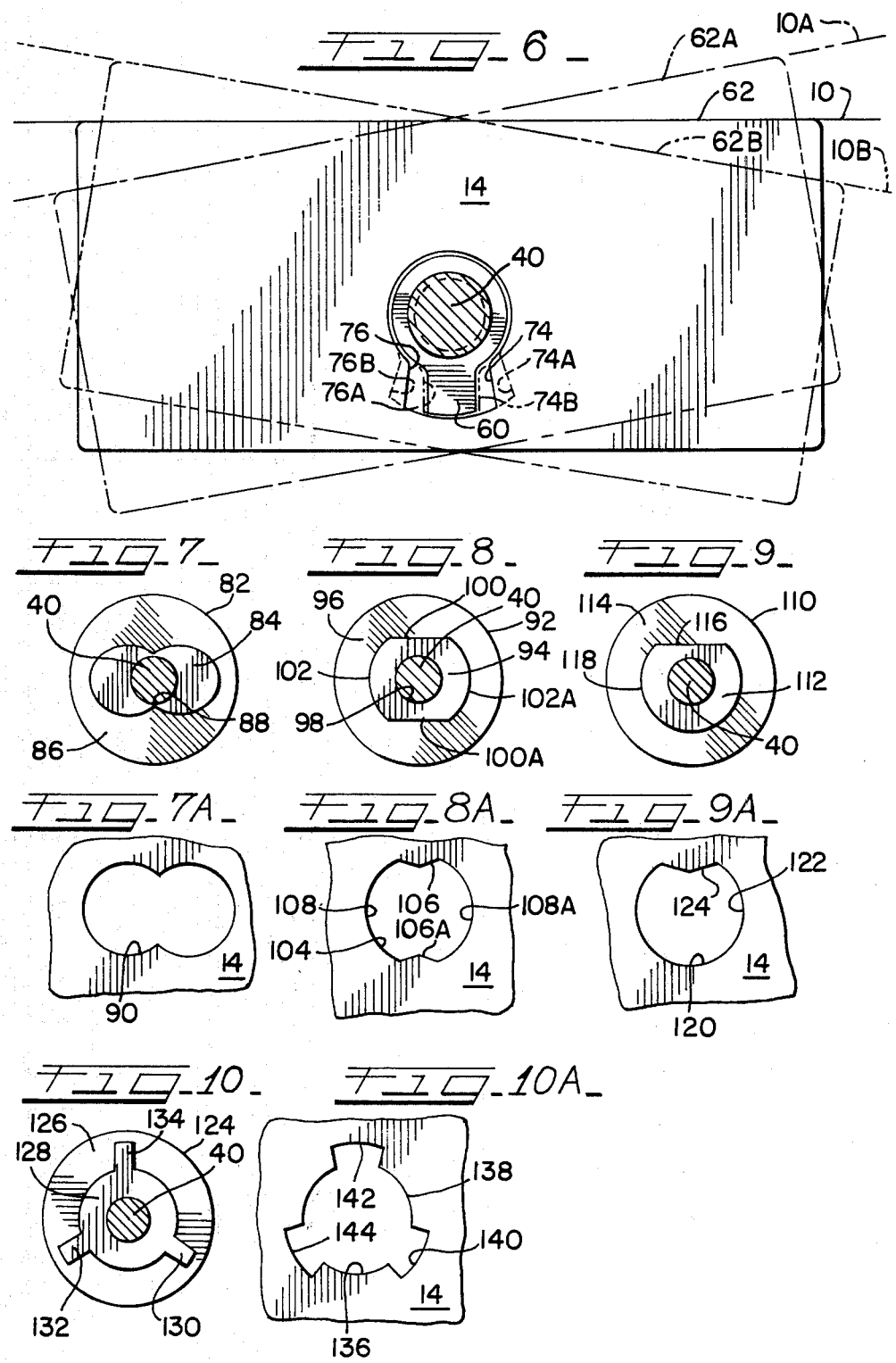

4,359,150

CONVEYOR BELT CLEANER

This application is a continuation-in-part of application Ser. No. 148,134, filed May 9, 1980, now abandoned.

BACKGROUND OF THE INVENTION

It has been known in the prior art to provide various types of mounting arrangements for conveyor belt cleaners in which mounting brackets are secured on a transverse cross-shaft. Extending from the mounts are arms on which belt cleaner blades are secured, generally between a fixed nut and an adjustable nut. Such an arrangement provides for removal and replacement of individual belt cleaner blades as they wear. It also provides for securing the belt cleaner blades against movement, either rotational or otherwise, when the outer nut is securely tightened. Arrangements of this type are shown and described in U.S. Pat. Nos. 1,975,591, 2,794,540, 3,342,312, 3,504,786, 3,598,231, 3,674,131, 3,994,358, 3,994,384, and 4,098,394. The problem posed by these prior art devices is that once the cleaner blade is securely fastened on the arm and the arm is raised so that the blade contacts the conveyor belt, there may be a misalignment of the blade with respect to the belt due to varying belt angles across the width of the belt. No provision is made for individual rotational adjustability of each blade to maximize conformity with the belt surface.

SUMMARY OF THE INVENTION

The present invention provides a belt cleaner mounting arrangement which allows for limited rotational movement of the cleaner blade about the central axis of the supporting arm so as to enable each cleaner blade to rotate, if necessary, to align the scraping edge of the blade with the particular section of the conveyor belt which it contacts. Thus, regardless of the variance in belt angle across the width of the belt, the individual cleaner blades will be allowed to adjust their position accordingly. The arrangement allows rotation within predetermined limits, but prevents pinwheeling or spinning of the blade on the arm which might result in damage to the belt or cleaner. When the arrangement is secured, all movement other than the limited rotational movement is prevented. One form of securement of the blade in the arm involves a pin-and-slot connection allowing the predetermined rotation and having seals at multiple points precluding the entrance of dirt into the connection.

DESCRIPTION OF THE DRAWINGS

FIG. 1 is a fragmentary elevational view of the belt cleaner and support.

FIG. 2 is a side view of the belt cleaner and support taken along the line 2—2 of FIG. 1.

FIG. 3 is a side view of the locating collar.

FIG. 4 is a face view of the collar.

FIG. 5 is a face view of a portion of a belt cleaner blade.

FIG. 6 is a face view of the belt cleaner blade partly in section, taken along the line 6—6 of FIG. 2.

FIG. 7 is a face view of an alternative embodiment of a locating collar.

FIG. 7(a) is a face view, partially broken away, of an alternative embodiment of a belt cleaner blade.

FIG. 8 is a face view of an alternative embodiment of a locating collar.

FIG. 8(a) is a face view, partially broken away, of an alternative embodiment of a belt cleaner blade.

FIG. 9 is a face view of an alternative embodiment of a locating collar.

FIG. 9(a) is a face view, partially broken away, of an alternative embodiment of a belt cleaner blade.

FIG. 10 is a face view of an alternative embodiment of a locating collar.

FIG. 10(a) is a face view, partially broken away, of an alternative embodiment of a belt cleaner blade.

FIG. 11 is a face view, partially broken away and partially in phantom, of a cleaner blade mounted as shown in FIG. 2.

DESCRIPTION OF THE PREFERRED EMBODIMENT

Figure 12:
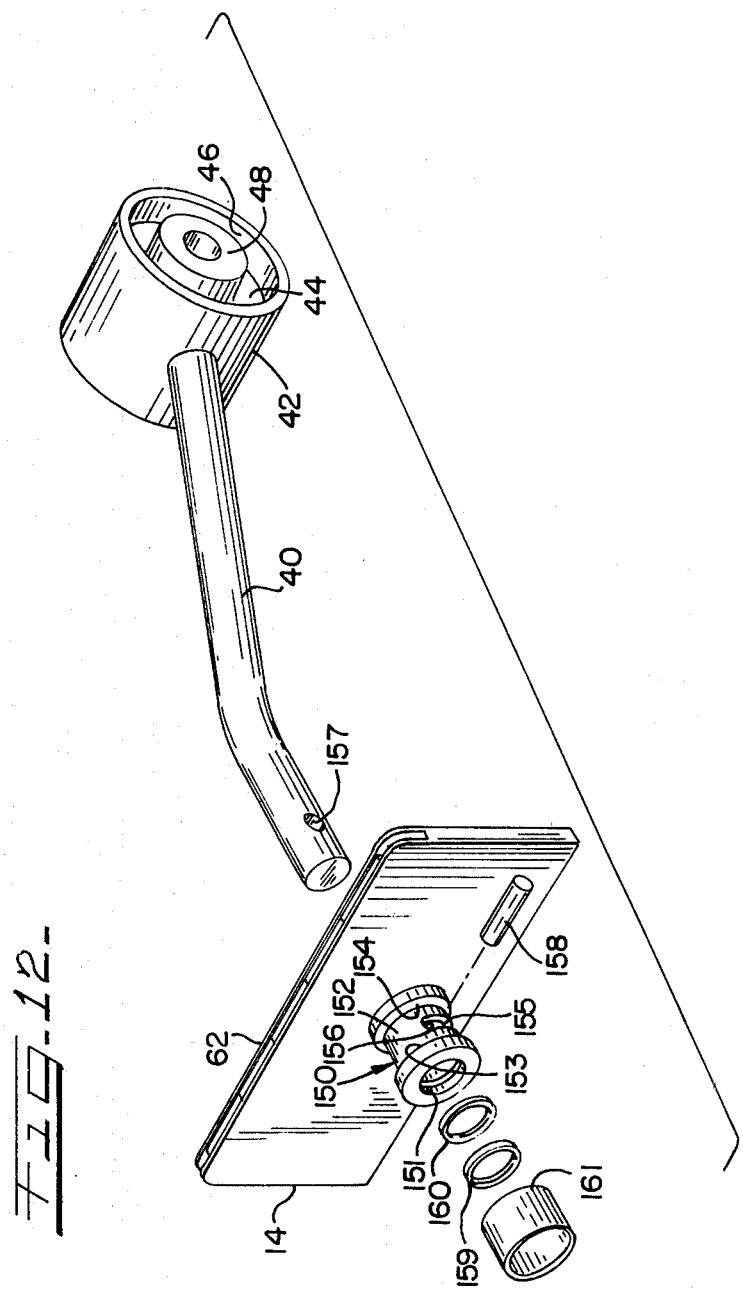
FIG. 12 is an exploded perspective view of an alternative mounting of the belt cleaner blade on a support arm including a pin-and-slot connection with the seals for preventing entrance of dirt or moisture into the connection.

A conveyor belt 10 and a mechanical belt cleaner 12 are illustrated in FIGS. 1 and 2. The belt cleaner 12 includes a mounting assembly 13 for supporting a belt cleaner blade 14 beneath the return run of the belt 10 to be cleaned. The assembly includes a support member 16 disposed beneath the return run extending transversely of the direction of conveyor belt travel. Integral clamps 18 are shown attached to the support member 16 by bolts 20 and nuts 21. The clamp 18 includes an upper portion 22 and a lower portion 24 which is of C-shape or semicylindrical configuration having an inner surface conforming to and abutting the tubular support 16. The upper portion 22 includes a pair of spaced apart upstanding brackets 26, 28, each of which define an opening therein, adapted to receive a bolt 34. A pair of friction washers 36, 38 are shown disposed adjacent and inside the brackets 26, 28.

The belt cleaner 12 includes a plurality of arms 40 each of which radiate from the axis of the bolts 34 and each of which support a scraper blade 14. The arm 40 is connected to an annular section 42. An elastomer bushing or torus 44 that is torsionally as well as otherwise elastic fits within an opening 46 of the circular section 42 and is affixed thereto so that the exterior of the torus is constrained against rotation relative to the portion 42. The interior of the torus has a liner or sleeve-like part 48 shown in dotted line in FIG. 2 which is metallic and of circular configuration so as to receive the bolt 34 therethrough to which is attached nut 35. The sleeve 48 is conventionally adhered or bonded to the interior elastomer portion of the torus 44. Each arm 40 is threaded at its outer end.

Affixed to each arm 40 is a locating collar 50 which includes an upper bearing surface 52 and a lower surface 54. As best shown in FIGS. 3 and 4, the locating collar 50 includes a central aperture 56 defined therethrough through which the end of the arm 40 is received. The collar 50 also includes an annular boss 58 surrounding the aperture 56 upstanding from the bearing surface 52. Radially extending from the annular boss is a finger 60. As best shown in FIG. 5, the scraper blade 14 includes a scraping edge 62 and a central aperture 64 defined through the blade through which the end of the arm 40 is inserted. The aperture 64 includes a first generally arcuate portion 66 of slightly greater cross-sectional diameter than the cross-sectional diameter of the outer periphery of the annular boss 58. The arcuate portion 66 is adapted to receive the annular boss 58 within its confines. The aperture 64 further defines a slot 68 connected to the arcuate portion 66, radially extending from the central axis of the arcuate portion. The slot 68 is of narrower dimension at its upper end 70 and of greater dimension at its lower end 72. The slot 68 is adapted to receive the radially extending finger 60 of the annular boss 58. The locating collar 50 and the aperture 64 cooperate to function as positioning means for the blade 14. Sides 74 and 76 of the slot 68 act as stops to limit the radial rotation of the blade 14 with respect to the arm 40.

As shown in FIG. 2, a resilient friction member 78, here shown as a plastic washer, is positioned adjacent the outer surface of the scraper blade 14. The washer is preferably made of a compressible material having some degree of lubricity and either nylon or ultra high molecular weight polyethylene have been found to perform satisfactorily. Securing means 80, here shown as a self-locking nut to resist loosening due to vibration, is threaded on the outer end of the arm 40 and is tightened against the washer 78 to a predetermined torque. When tightened as illustrated in FIG. 2, the nut 80 and washer 78 inhibit movement of the cleaner blade.

The operation of the conveyor belt cleaner of the present invention is as follows. As previously described mounting brackets 18 are fastened to the cross-shaft 16 by bolts 20 and nuts 21. The arms 40 are secured to the clamp 18 by inserting bolt 34 through the bracket 28, washer 38, sleeve 48, washer 36, and bracket 26. The nut 35 is then tightened to a predetermined torque so as to press the washers 36 and 38 against the outer ends of the sleeve 48 to prevent rotation of the arm 40 about the axis of the bolt 34. The elastomeric bushing 44 does allow for some give. Next the wiper blade 14 is inserted over the end of the arm 40 such that the upstanding annular boss 58 is lying within the arcuate portion 66 of the aperture 64 defined in the blade 14. The blade 14 is positioned such that the radially extending finger 60 is disposed in the slot 68 midway between the sidewalls 74 and 76 as shown in solid line in FIG. 6. The resilient washer 78 is then positioned over the end of the arm 40 adjacent the outer surface of the belt cleaner blade 14. The self-locking nut 80 is then threaded over the end of the arm and tightened to a predetermined torque. As shown in FIG. 11, the washer 78 covers and seals the aperture 64 defined in the belt cleaner blade.

Next, the cross-shaft 16 is rotated by any of a number of conventional methods such as, for example, shown in U.S. Pat. No. 3,098,394 so as to bring the belt cleaner blades 14 into contact with the conveyor belt 10 to be cleaned. This arrangement is shown in solid lines in FIG. 6. As illustrated, the scraping edge 62 is biased against the lower surface of the belt 10 across its entire width. Under normal operating conditions the angle of inclination of the conveyor belt varies across its width and the arms 40 are generally mounted on an axis which runs parallel to the transverse direction of travel of the conveyor belt. It can readily be seen that if the conveyor belt is of substantial width and tends to bow in the center and rise toward its outer ends, the individual cleaner blades will not be in conformity with the configuration of the conveyor belt. The belt to the right of center may be inclined upwardly as per the dotted line 10A of FIG. 6. The belt to the left of center may be inclined as per the dotted line 10B of FIG. 6.

When the cross-shaft 16 is rotated to bring the cleaner blades into contact with the conveyor belt, the degree of tension urging the blades against the belt can be set at a predetermined value. The frictional force exerted by the nut 80 and washer 78 against the cleaner blade is sufficient to preclude rotation of the belt cleaner blade about the axis of the arm until a predetermined force, i.e., the friction force has been overcome. All other movement of the blade is inhibited as well.

According to the present invention, the blade is urged against the belt with a sufficient degree of force and the cleaner blade 14 is allowed to pivot about the central axis of the arm 40 within the predetermined limits established by the sidewalls 74 and 76 to allow the scraping edge 62 to conform its alignment to the angle of the conveyor belt. It has been determined that a rotation of plus or minus 15° is generally sufficient to allow for most conveyor belt variance. The walls 74 and 76 prevent rotation beyond these limits and further prevent spinning or pinwheeling of the blade about the axis of the arm.

When the conveyor belt is aligned along line 10A of FIG. 6, the cleaner blade 14 rotates so that the scraping edge is positioned along the dotted line 62A. The edge 76 of the aperture 64 assumes the position as shown in dotted line 76A of FIG. 6. This is the maximum allowable counterclockwise rotation of the blade 14 with respect to the arm 40. If the conveyor belt is positioned along the line 10B of FIG. 6, the cleaner blade 14 will rotate clockwise with respect to the arms 40 and the scraping edge 62 will lie along the dotted line 62B of FIG. 6. The side wall 74 of the slot 68 will occupy the position shown in dotted line 74B of FIG. 6. This is the maximum allowable clockwise rotation of the belt cleaner blade 14 with respect to the arm 40.

FIGS. 7, 8, 9, and 10 illustrate alternate embodiments of the locating collar and FIGS. 7A, 8A, 9A, and 10A illustrate alternate embodiments of the apertures formed in the wiper blade to correspond with the locating collars shown in the corresponding figures. Specifically, FIG. 7 illustrates a locating collar 82 which includes an upstanding projection 84 extending above the bearing surface 86 of the locating collar. The projection 84 has a cross-sectional configuration defined by a pair of intersecting circles. The collar 82 includes a centrally located aperture 88 to allow for insertion of the arm 40 therethrough. The corresponding aperture 90 defined in the wiper blade 14 as shown in FIG. 7A defines a cross-sectional area of similar shape to the projection 84, but of slightly larger dimension so as to receive the projection therethrough. As can easily be seen, the positioning means defined by the collar 82, the projection 84 and the aperture 90 permits rotational movement between the cleaner blade 14 and the arm 40 within predetermined limits.

FIG. 8 illustrates a locating collar 92. A projection 94 extends upwardly from the bearing surface 96 of the collar. The collar includes a central aperture 98 through which the arm 40 is adapted to pass. The projection 94 includes a pair of flat sections 100 and 100A which are connected by a pair of arcuate sections 102 and 102A. FIG. 8A illustrates a mating aperture 104 defined in wiper blade 14. The aperture 104 is of generally circular configuration and of larger dimension than the projection 94 which is designed to lie positioned therein. A pair of radially inwardly extending generally V-shaped projections 106 and 106A join a pair of arcuate segments 108 and 108A. As can easily be seen, the positioning means defined by collar 92, projection 94, and aperture 104 allows for rotational movement between the arm 40 and the belt cleaner blade 14 within predetermined limits.

FIG. 9 shows a locating collar 110. A projection 112 of generally circular configuration extends upwardly from a bearing surface 114 of the locating collar 110. The projection 112 includes a flat section 116 connected to an arcuate section 118. FIG. 9A illustrates a corresponding aperture 120 defined in belt cleaner blade 14. The aperture is of generally circular configuration and of larger dimension than the projection 112 which is designed to be positioned therein. The aperture 120 includes a generally arcuate section 122 and a radially inwardly extending generally V-shaped projection 124 connecting the ends of the arcuate portion 122. As can easily be seen, the positioning means defined by collar 110, projection 112, and aperture 120 allow limited rotation of the cleaner blade 14 with respect to the arm 40 within predetermined limits.

FIG. 10 illustrates a locating collar 124. Extending upwardly from a bearing surface 126 of the collar 124 is a generally annular boss 128 and three radially extending fingers 130, 132, and 134. FIG. 10A illustrates a corresponding aperture 136 defined in the belt cleaner blade 14. The aperture 136 includes a generally circular portion 138 of larger dimension than the annular boss 128 which is designed to be positioned therein. The aperture 136 also includes three radially extending slots 140, 142, and 144 which are adapted to receive the fingers 130, 132, and 134 respectively. It can easily be seen that the positioning means defined by collar 124, boss 128, fingers 130, 132, 134, and slots 138, 140, 144 provides for rotational movement of said belt cleaner blade 14 with respect to arm 40 within predetermined limits.

FIG. 12 illustrates an alternative support arm and scraper blade arrangement having a modified connection between the blade and arm which limits radial rotation of the blade relative to the arm and acts as stops to rotation of the blade in either direction about the central axis of the supporting arm similarly to the previously described arrangement. The cleaner blade can rotate to the limited extent necessary to align the blade and its scraping edge with the underside of the conveyor belt so that the blade is allowed to adjust its position relative to the belt, regardless of the belt angle across the belt's width, but prevents spinning of the blade on the arm by reason of the limit stops provided. With this alternative arrangement all movement of the blade relative to the support arm except the limited rotation within the stops, is prevented when the blade and support arm are assembled and secured.

In this arrangement the support arm 40 has its end associated with the scraper blade 14 unencumbered by the locating collar provided on the previously described form and where it extends through the scraper blade is of generally the same diameter as the remaining length of the arm. The free end of the arm 40 extends through an aperture in the scraper blade just as in the previous form but in this alternative arrangement the blade 14 is provided with a swivel mount 150 having a central aperture 151 through which the support arm 40 extends. The swivel mount is shown in the form of a bushing which has a surrounding collar 152 with front and rear shoulders 153 and 154. An arcuate groove or slot 155 extends partially around the collar 152 and provides limit stops at opposite ends thereof, such as at 156 to restrict rotative movements of the scraper blade within the desired limits.

The support arm 40 has an opening 147 disposed diametrically therethrough adjacent to the end thereof where it enters the aperture 151 and when the arm is entered into this aperture to register the support arm opening 157 with the slot 155 a hardened dowel pin 158 is inserted through the opening 157 within the slot 155, with the pin projecting at opposite ends into the area of the slot so that the pin movement of the scraper blade 14 to the degree of rotation permitted by the length of the slot 155.

The mounting of the support arm 40 within the swivel mount collar 152 is sealed against the entry of dirt and moisture by means of O-rings 159 and 160 disposed about the arm 40 within the swivel mount aperture 151 at the front and rear thereof, respectively. The slot 155 through the collar portion 152 is sealed by an elastic cover 161 which encircles the collar portion and extends between the front and rear shoulders 153 and 154. Thus the limited swivel connection between the support arm 40 and the scraper blade 14 is completely sealed against entry of any foreign material which may be present in the environment in which the mounting arrangement is used.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A conveyor belt cleaner including an arm having a first end adapted to be connected to a support mounted transverse to the direction of conveyor belt travel and a second end adapted to support a belt cleaner blade;
a belt cleaner blade secured on said second end of said arm and adapted to contact said conveyor belt;
positioning means associated with said arm and said blade to permit rotation of said blade about a central axis of said arm, said positioning means including one or more stops to limit the rotation of said blade about said arm within predetermined limits.

2. A conveyor belt cleaner as in claim 1 including securing means associated with said arm and said blade so as to inhibit movement of said cleaner blade.

3. A conveyor belt cleaner as in claim 1 in which said positioning means includes a locating collar affixed to said arm having an upper bearing surface and a lower surface.

4. A conveyor belt cleaner as in claim 3 including a generally annular boss located on said bearing surface of said locating collar.

5. A conveyor belt cleaner as in claim 4 including at least one finger radially extending from said annular boss.

6. A conveyor belt cleaner as in claim 5 in which said positioning means also includes an aperture defined in said wiper blade including a first generally arcuate portion adapted to receive said annular boss and a second groove portion connecting with said arcuate portion and of greater lateral dimension than said finger adapted to receive said finger and to allow relative rotational movement between said cleaner blade and said arm within predetermined limits.

7. A conveyor belt cleaner as in claim 2 including a resilient friction member disposed between said cleaner blade and said securing means.

8. A conveyor belt cleaner as in claim 6 in which a plurality of fingers radially extend from said annular boss and a plurality of groove portions are defined in said wiper blade connecting with said arcuate portion, each groove portion adapted to receive a radially extending finger.

9. A conveyor belt cleaner as in claim 4 in which said boss includes an arcuate portion and a flat portion and in which said positioning means also includes an aperture defined in said cleaner blade in which a first generally arcuate portion extends over a greater arc than the arcuate portion of said boss, said arcuate portion adapted to receive said boss and a radially inwardly extending generally V-shaped projection connecting the ends of said arcuate portion adapted to co-act with said boss so as to limit the rotational movement between said cleaner blade and said arm.

10. A conveyor belt cleaner as in claim 3 including an upstanding projection located on said bearing face of said locating collar, said projection having a cross-sectional configuration defined by a pair of intersecting circles and in which said positioning means also includes an aperture defined in said wiper blade of similar cross-sectional shape, but of slightly larger diameter than said projection and adapted to receive said projection therethrough and to allow limited rotational movement of said cleaner blade and said arm within predetermined limits.

11. A conveyor belt cleaner as in claim 1 in which said positioning means include a bushing affixed to said cleaner blade, said bushing defining a central aperture therethrough adapted to slidably receive said arm.

12. A conveyor belt cleaner as in claim 11 in which said bushing defines an arcuate groove on a portion of the outer periphery thereof and in which said positioning means includes an opening formed through said second end of said arm generally perpendicular to said central axis thereof and a pin adapted to be inserted through said arcuate groove and through said opening in said arm, said pin adapted to extend beyond the lateral edges of said arm so as to contact one or the other of the terminal ends of said arcuate groove upon rotation of said blade with respect to said arm to thereby limit the relative rotation of said blade with respect to said arm within predetermined limits.

13. A conveyor belt cleaner as in claim 12 including a flexible cover adapted to be positioned over said bushing to protect against entry of contaminants between said bushing and said arm.

* * * * *